United States Patent [19]

Neely, Jr.

[11] 4,166,747

[45] Sep. 4, 1979

[54] GLASS FIBER COMPOSITION

[75] Inventor: Homer E. Neely, Jr., Tarentum, Pa.

[73] Assignee: PPG Industries, Inc., Pittsburgh, Pa.

[21] Appl. No.: 841,613

[22] Filed: Oct. 13, 1977

[51] Int. Cl.$^2$ .................... C03C 13/00; C03C 3/08
[52] U.S. Cl. ........................................ 106/50; 106/54
[58] Field of Search ................................ 106/50, 54

[56] References Cited

U.S. PATENT DOCUMENTS

| 3,095,311 | 6/1963 | Wranau et al. | 106/50 |
|---|---|---|---|
| 3,881,945 | 5/1975 | Trojer et al. | 106/50 |
| 4,063,001 | 12/1977 | Zlochower | 106/50 |

Primary Examiner—O. R. Vertiz
Assistant Examiner—Mark Bell
Attorney, Agent, or Firm—Kenneth J. Stachel; John E. Curley

[57] ABSTRACT

A glass composition suitable for use in manufacturing glass fibers is described which possesses good electrical properties. The glass is characterized by having a boron oxide content below normal glass fiber glass and increased alkaline earth metal oxides with small quantities of magnesium oxide being present. The glasses produced by the composition have acceptable viscosities in the glass fiber making range and exhibit good stability to devitrification. Opacity is not encountered with these glasses as would be expected.

11 Claims, No Drawings

GLASS FIBER COMPOSITION

BACKGROUND OF THE INVENTION

Glass fibers which are produced on a commercial scale today in the manufacture of continuous glass strands are typically either "E" glasses or "621" glasses. Most of the continuous glass fibers made today are glasses of the "E" glass type with the balance primarily being of the "621" type.

"E" glass is generally described and claimed in U.S. Pat. No. 2,334,961. These glasses are typified by the composition listed below in Table I with the constituents being in weight percent:

Table I

| Ingredients | Percent |
| --- | --- |
| $SiO_2$ | 52–56 |
| $Al_2O_3$ | 12–16 |
| CaO | 16–19 |
| MgO | 3–6 |
| $B_2O_3$ | 9–11 |

"621" glass is a modification of a typical "E" glass formulation such as shown above and is typically devoid of MgO, with a CaO content much higher than an "E" glass. The "621" glasses are described in more detail in U.S. Pat. No. 2,571,074. In general these glasses have a composition as shown in Table II, the percentages shown being by weight:

Table II

| Ingredients | Percent |
| --- | --- |
| $SiO_2$ | 52–56 |
| $Al_2O_3$ | 12–16 |
| CaO | 19–25 |
| $B_2O_3$ | 8–13 |

As will be readily understood by the skilled artisan, minor constituents are present in both "E" and "621" glasses. These constituents are typically $F_2$, $Fe_2O_3$, $K_2O$, $Na_2O$ and MgO and on occasion BaO. In general these minor constituents are present each in amounts of less than 1 percent by weight in the glass.

As will readily be appreciated from an analysis of the above formulations, the elimination of magnesium oxide in the "621" glass permitted the use of lower quantities of $B_2O_3$ in an "E" glass, but required the addition of substantially more calcium oxide and the absence of magnesium oxide.

While both of these glasses have achieved considerable success in the continuous glass fiber field, it is still apparent that considerable quantities of $B_2O_3$ are still required. In recent years the cost of boric acid and colemanite ore, another source of boric acid, has risen steadily causing overall batch costs in the manufacture of glass fibers to increase substantially. While all batch costs have in general increased, the boric acid constituent has had a particularly significant effect on the increased cost of glasses for the manufacture of continuous glass fibers. It is thus desirable to reduce the quantities of $B_2O_3$ in glasses used to make continuous glass fibers while still adhering to the properties of the "E" and "621" glasses.

In providing a lower $B_2O_3$ content in the glass used to manufacture glass fibers, substantial reduction in batch costs are achieved. The other batch constituents are adjusted to compensate for the $B_2O_3$ reduction and a small quantity of MgO is usually present in the novel glass of this invention.

THE PRESENT INVENTION

In accordance with the instant invention a modification of normal fiber glass batch mixtures is made which provides a fiber glass composition which is equal to or better than normal fiber glass compositions in glass properties while achieving a substantially lower cost glass for the manufacture of glass fibers. Thus, in accordance with the present invention a fiber glass composition is provided which contains a substantially reduced $B_2O_3$ content when compared with conventional glasses used to manufacture glass fibers.

In general the glasses of the instant invention have the compositions shown in Table III, the percent being percent by weight:

Table III

| Ingredients | Percent |
| --- | --- |
| $SiO_2$ | 54–55 |
| $Al_2O_3$ | 13–14 |
| CaO | 22–24 |
| MgO | 0.2–0.5 |
| $B_2O_3$ | 5.5–6.8 |

In the preferred embodiments of the instant invention the glasses have the composition set forth in Table IV, the percents being percent by weight of the glass:

Table IV

| Ingredients | Percent |
| --- | --- |
| $SiO_2$ | 54.2–55 |
| $Al_2O_3$ | 13–14 |
| CaO | 22.1–23.2 |
| MgO | 0.3–0.4 |
| $B_2O_3$ | 6.5–6.8 |

In either of the above compositions listed in Tables III and IV, an $F_2$ content of between 0.3 to 1.4 may be used and preferably between 0.7 to 1.4. Other substituents may also be present in small amounts, typically below 1 percent. In general $Fe_2O_3$ is present in quantities of 0.1 to 0.5 percent, preferably 0.3; $Na_2O$ is present at between 0.1 to 0.7, preferably 0.5; and $TiO_2$ between 0.2 to 0.8, preferably 0.6. $K_2O$ in amounts of 0.1 to 0.5, typically 0.2 may also be found. These minor constituents of typical "E" glasses are referenced in *The Manufacturing Technology of Continuous Glass Fibers*, K. L. Lowenstein, Elsevir Scientific Publishing Co., N.Y. 1973 on pages 29–30. In the same publication, pages 31–36 a discussion of the introduction of the batch ingredients resulting in the formation of "E" glasses is also presented.

In accordance with this invention, it has been discovered that the $B_2O_3$ content of a glass used in the manufacture of continuous glass fibers can be reduced to between about 5.5 and about 6.8 percent by weight, and still maintain good physical properties in the glass fibers produced from such a glass. In order to accomplish this reduction in the $B_2O_3$ content of the glass fibers, the CaO content of the glass is increased substantially over a typical "E" glass. Thus a CaO content in the glass of 22–24 percent is typically employed. In conjunction with an increase in the CaO content of the glass being higher than typical "E" glass, a small amount of MgO is also employed and is introduced normally as tramp material in the limestone used to supply CaO. The MgO content is typically 0.2 to 0.5 percent by weight. The increased CaO content of the batch and the small quantities of MgO used, it is believed, permit the reduction of the $B_2O_3$ content of the glass accomplished. The content of $B_2O_3$ is substantially reduced over the typical glasses now employed to produce continuous glass fibers and it is surprising that the reductions have been accomplished in view of the art which suggests that such reductions would result in serious devitrification problems at higher temperatures.

Utilizing the formulations of the instant invention a reduction of $B_2O_3$ in the glasses of this invention of 22 to 25 percent over conventional "621" glasses is readily achieved. Similarly, reductions of between 22 and 28 percent on the $B_2O_3$ content of a typical "E" glass are possible. In terms of batch costs, these reductions can achieve an overall batch cost reduction of 15 percent.

In preparing glasses in accordance with the instant invention, the following examples are illustrative of the procedures that may be followed to accomplish the ends of the invention, i.e., a suitable glass for producing continuous glass fibers at a reduced cost and $B_2O_3$ content.

EXAMPLE I

A glass batch composition was prepared by mixing the ingredients listed in Table V in the amounts shown:

Table V

| Ingredients | Grams |
|---|---|
| Silica | 183.2 |
| Clay | 166.7 |
| Limestone | 181.2 |
| Boric Acid | 57.0 |
| Fluorspar | 7.0 |
| Sodium Sulfate | 4.8 |
| Ammonium Sulfate | 1.3 |
| Coal | 0.5 |

The batch ingredients listed above in the amounts listed were mixed and then melted at temperatures between 2600° F. and 2700° F. (1425° C. and 1480° C.). The molten glass produced by this melting was fiberized in a single hole bushing at forming speeds of 26.7 feet per second (8.1 meters per second) at temperatures in the range of 2330° F. to 2350° F. (1277° C. to 1288° C.). Measurements of the softening point and liquidus of the glass were made and fiber tensile strength was measured. These measurements and the chemical composition of the glass produced, calculated on the basis of batch ingredients used, are listed below in Table VI:

Table VI

| Glass Composition - Example I | |
|---|---|
| Ingredients | Weight Percent |
| $SiO_2$ | 55 |
| $Al_2O_3$ | 13.6 |
| $Fe_2O_3$ | 0.3 |
| MgO | 0.3 |
| CaO | 22.2 |
| $TiO_2$ | 0.6 |
| $B_2O_3$ | 6.8 |
| $Na_2O$ | 0.5 |
| $F_2$ | 0.7 |
| Softening point | - 1591° F.-1596° F. (866° C.-869° C.) |
| Liquidus | - 2170° F. (1187° C.) |
| Tensile Strength of Fiber | - 510 (Thousand pounds per square inch) |

EXAMPLE II

A glass batch composition was prepared by mixing the ingredients listed in Table VII in the amounts shown:

Table VII

| Ingredients | Grams |
|---|---|
| Silica | 180.5 |
| Clay | 164.0 |
| Limestone | 189.6 |
| Boric Acid | 57.0 |
| Fluorspar | 7.0 |
| Sodium Sulfate | 4.8 |
| Ammonium Sulfate | 1.3 |
| Coal | 0.5 |

The batch ingredients listed above in the amounts listed were mixed and then melted at temperatures between 2600° F. and 2700° F. (1425° C. and 1480° C.). The molten glass produced by this melting was fiberized in a single hole bushing at forming speeds of 26.7 feet per second (8.1 meters per second) at temperatures in the range of 2330° F. to 2345° F. (1277° C. to 1285° C.). Measurements of the softening point and liquidus of the glass were made and the tensile strength of the fiber was measured. These measurements and these measurements and the chemical composition of the glass produced, calculated basis the batch ingredients used, are listed below in Table VIII:

Table VIII

| Glass Composition - Example II | |
|---|---|
| Ingredients | Weight Percent |
| $SiO_2$ | 54.3 |
| $Al_2O_3$ | 13.4 |
| $Fe_2O_3$ | 0.3 |
| MgO | 0.3 |
| CaO | 23.2 |
| $TiO_2$ | 0.6 |
| $B_2O_3$ | 6.8 |
| $Na_2O$ | 0.5 |
| $F_2$ | 0.7 |
| Softening point | - 1580° F.-1590° F. (860° C.-865.5° C.) |
| Liquidus | - 2210° F. (1210° C.) |
| Tensile Strength of Fiber | - 510 (Thousand pounds per square inch) |

EXAMPLE III

A glass batch composition was prepared by mixing the ingredients listed in Table IX in the amounts shown:

Table IX

| Ingredients | Grams |
|---|---|
| Silica | 182.6 |
| Clay | 165.8 |
| Limestone | 171.6 |
| Boric Acid | 53.8 |
| Fluorspar | 14.0 |
| Sodium Sulfate | 4.8 |
| Ammonium Sulfate | 1.3 |
| Coal | 0.5 |

The batch ingredients listed above in the amounts listed were mixed and then melted at temperatures between 2600° F. and 2700° F. (1425° C. and 1480° C.). The molten glass produced by this melting was fiberized in a single hole bushing at forming speeds of 26.7 feet per second (8.1 meters per second) at temperatures in the range of 2335° F. to 2350° F. (1280° C. to 1288° C.). Measurements of the softening point and liquidus of the glass were made and the tensile strength of the fiber was measured. These measurements and the chemical composition of the glass produced, calculated basis the batch ingredients used, are listed below in Table X:

Table X

| Glass Composition - Example III | |
|---|---|
| Ingredients | Weight Percent |
| $SiO_2$ | 54.9 |
| $Al_2O_3$ | 13.5 |
| $Fe_2O_3$ | 0.3 |
| MgO | 0.3 |
| CaO | 22.1 |
| $TiO_2$ | 0.6 |
| $B_2O_3$ | 6.5 |
| $Na_2O$ | 0.5 |
| $F_2$ | 1.4 |
| Softening point | - 1572° F.–1579° F. (856° C.–859° C.) |
| Liquidus | - 2140° F. (1171° C.) |
| Tensile Strength of Fiber | - 515 (Thousand pounds per square inch) |

EXAMPLE IV

A glass batch composition was prepared by mixing the ingredients listed in Table XI in the amounts shown:

Table XI

| Ingredients | Grams |
|---|---|
| Silica | 180.3 |
| Clay | 163.7 |
| Limestone | 178.9 |
| Boric Acid | 53.8 |
| Fluorspar | 14.0 |
| Sodium Sulfate | 4.8 |
| Ammonium Sulfate | 1.3 |
| Coal | 0.5 |

The batch ingredients listed above were mixed and then melted at temperatures between 2600° F. and 2700° F. (1425° C. and 1480° C.). The molten glass produced by this melting was then fiberized in a single hole bushing at forming speeds of 26.7 feet per second (8.1 meters per second) at temperatures between 2335° F. to 2355° F. (1280° C. to 1290° C.). Measurements of the softening point and liquidus of the glass were made and the tensile strength of the fiber was measured. These measurements and the chemical composition of the glass, calculated basis the batch ingredients used, are listed in Table XII:

Table XII

| Glass Compsition - Example IV | |
|---|---|
| Ingredients | Weight Percent |
| $SiO_2$ | 54.2 |
| $Al_2O_3$ | 13.4 |
| $Fe_2O_3$ | 0.3 |
| MgO | 0.3 |
| CaO | 23.0 |
| $TiO_2$ | 0.6 |
| $B_2O_3$ | 6.5 |
| $Na_2O$ | 0.5 |
| $F_2$ | 1.4 |
| Softening point | - 1576° F.–1578° F. (858° C.–859° C.) |
| Liquidus | - 2174° F. (1190° C.) |
| Tensile Strength of Fiber | - 500 (Thousand pounds per square inch) |

EXAMPLE V

A "621" glass batch composition was prepared by mixing the ingredients listed in Table XIII:

Table XIII

| Ingredients | Grams |
|---|---|
| Silica | 178.0 |
| Clay | 161.6 |
| Limestone | 166.7 |
| Boric Acid | 73.1 |
| Fluorspar | 14.0 |
| Sodium Sulfate | 4.8 |
| Ammonium Sulfate | 1.3 |
| Coal | 0.5 |

The batch ingredients listed above in the amounts listed were mixed and then melted at temperatures between 2600° F. and 2700° F. (1425° C. and 1480° C.). The molten glass produced by this melting was fiberized in a single hole bushing at forming speeds of 26.7 feet per second (8.1 meters per second at temperatures between 2330° F. to 2350° F. (1277° C. to 1288° C.). Measurements of the softening point and liquidus of the glass were made and fiber tensile strength was measured. These measurements and the chemical composition of the glass produced, calculated basis the batch ingredients used, are listed below in Table XIV:

Table XIV

| Glass Composition - Example V | |
|---|---|
| Ingredients | Weight Percent |
| $SiO_2$ | 53.5 |
| $Al_2O_3$ | 13.2 |
| $Fe_2O_3$ | 0.3 |
| MgO | 0.2 |
| CaO | 21.6 |
| $TiO_2$ | 0.6 |
| $B_2O_3$ | 8.8 |
| $Na_2O$ | 0.5 |
| $F_2$ | 1.4 |
| Softening point | - 1565° F.–1575° F. (852° C.–857° C.) |
| Liquidus | - 2195° F. (1202° C.) |
| Tensile Strength of Fiber | - 505 (Thousand pounds per square inch) |

As can be readily appreciated from the results shown by Examples I through IV and the "621" glass of Example V, the applicant's composition produced glass of acceptable properties in terms of liquidus, softening point and tensile strength which substantially reduces the $B_2O_3$ content of the glass.

While the invention has been described with reference to certain specific embodiments, it is not intended that it be limited thereby except insofar as appears in the accompanying claims.

I claim:

1. A glass fiber of an improved glass composition having a reduced boron content but still maintaining acceptable properties of liquidus temperature, softening point, and tensile strength consisting of 54 to 55 percent $SiO_2$, 13 to 14 percent $Al_2O_3$, 22 to 24 percent CaO, 0.2 to 0.5 percent MgO, 5.5 to 6.8 percent $B_2O_3$ and 0.7 to 1.4 percent $F_2$, and less than 1 percent of each of the other substituents including $Fe_2O_3$, $Na_2O$, $TiO_2$, $K_2O$ all percents being by weight of the composition.

2. A glass fiber of an improved glass composition having a reduced boron content but still maintaining acceptable properties of liquidus temperature, softening point, and tensile strength consisting of the following composition by weight:

| | |
|---|---|
| $SiO_2$ | 54–55 |
| $Al_2O_3$ | 13–14 |
| CaO | 22–24 |
| MgO | 0.2–0.5 |
| $B_2O_3$ | 5.5–6.8 |

And less than 1 percent each of other substituents including $Fe_2O_3$, $Na_2O$, $TiO_2$, $K_2O$.

3. A glass fiber of an improved glass composition having a reduced boron content but still maintaining acceptable glass properties of liquidus temperature, softening point, and tensile strength consisting of the following composition by weight:

| | |
|---|---|
| $SiO_2$ | 54.2–55 |
| $Al_2O_3$ | 13–14 |
| CaO | 22.1–23.2 |
| MgO | 0.3–0.4 |
| $B_2O_3$ | 6.5–6.8 |

And less than 1 percent each of other substituents including $Fe_2O_3$, $Na_2O$, $TiO_2$, $K_2O$.

4. A glass fiber of an improved glass composition having a reduced boron content but still maintaining acceptable glass properties of liquidus temperature, softening point, and tensile strength consisting of the following composition by weight:

| | |
|---|---|
| $SiO_2$ | 54–55 |
| $Al_2O_3$ | 13–14 |
| CaO | 22–24 |
| MgO | 0.2–0.5 |
| $B_2O_3$ | 5.5–6.8 |
| $Fe_2O_3$ | 0.1–0.5 |
| $Na_2O$ | 0.1–0.7 |
| $TiO_2$ | 0.2–0.8 |
| $F_2$ | 0.3–1.4 |
| $K_2O$ | 0.1–0.5 |

5. A glass fiber of an improved glass composition having a reduced boron content but still maintaining acceptable glass properties of liquidus temperature, softening point, and tensile strength consisting of the following composition by weight:

| | |
|---|---|
| $SiO_2$ | 54–55 |
| $Al_2O_3$ | 13–14 |
| CaO | 22.1–23.2 |
| MgO | 0.3–0.4 |
| $B_2O_3$ | 6.5–6.8 |
| $Fe_2O_3$ | 0.3 |
| $Na_2O$ | 0.5 |
| $TiO_2$ | 0.6 |
| $F_2$ | 0.7–1.4 |
| $K_2O$ | 0.2 |

6. In a glass fiber composition having present silica, $Al_2O_3$, CaO, and $B_2O_3$, the improvement of providing an improved glass composition having a reduced boron content but still maintaining acceptable glass properties of liquidus temperature, softening point, and tensile strength consisting of having present silica between 54 to 55 percent, $Al_2O_3$ between 13 to 14 percent, CaO between 22 to 24 percent, a $B_2O_3$ content of between 5.5 to 6.8 percent, and a MgO content of between 0.2 to 0.5 percent, and less than 1 percent each of other substituents including $Fe_2O_3$, $Na_2O$, $TiO_2$, and $K_2O$ all percent being by weight of the composition.

7. In a glass fiber composition having present silica, $Al_2O_3$, CaO, and $B_2O_3$ the improvement of providing an improved glass composition having a reduced boron content but still maintaining acceptable glass properties of liquidus temperature, softening point, and tensile strength consisting of having present therein silica in an amount between 54 to 55 percent, $Al_2O_3$ in an amount between 13 to 14 percent, calcium oxide in an amount between 22 to 24 percent, between 6.5 and 6.8 percent $B_2O_3$, and MgO between 0.2 to 0.5 percent, and less than 1 percent each of other substituents including $Fe_2O_3$, $Na_2O$, $TiO_2$ and $K_2O$ all percents being by weight of the composition.

8. In a glass fiber composition having present silica, $Al_2O_3$, CaO, and $B_2O_3$, the improvement of providing an improved glass composition having a reduced boron content but still maintaining acceptable glass properties of liquidus temperature, softening point, and tensile strength consisting of having present silica between 54 to 55 percent, $Al_2O_3$ between 13 to 14 percent, CaO between 22 to 24 percent, $B_2O_3$ between 6.5 to 6.8 percent and, MgO between 0.3 to 0.4 percent, and less than 1 percent each of other substituents including $Fe_2O_3$, $Na_2O$, $TiO_2$, and $K_2O$, all percents being by weight of the composition.

9. The glass fiber of claim 6 wherein $F_2$ is present between 0.3 to 1.4 percent by weight.

10. The glass fiber of claim 7 wherein $F_2$ is present between 0.3 and 1.4 percent.

11. The glass fiber of claim 8 wherein $F_2$ is present between 0.3 and 1.4 percent by weight.

* * * * *